(No Model.) 5 Sheets—Sheet 1.
C. LANCASTER & J. STURGEON.
MOTOR CAR.
No. 467,741. Patented Jan. 26, 1892.
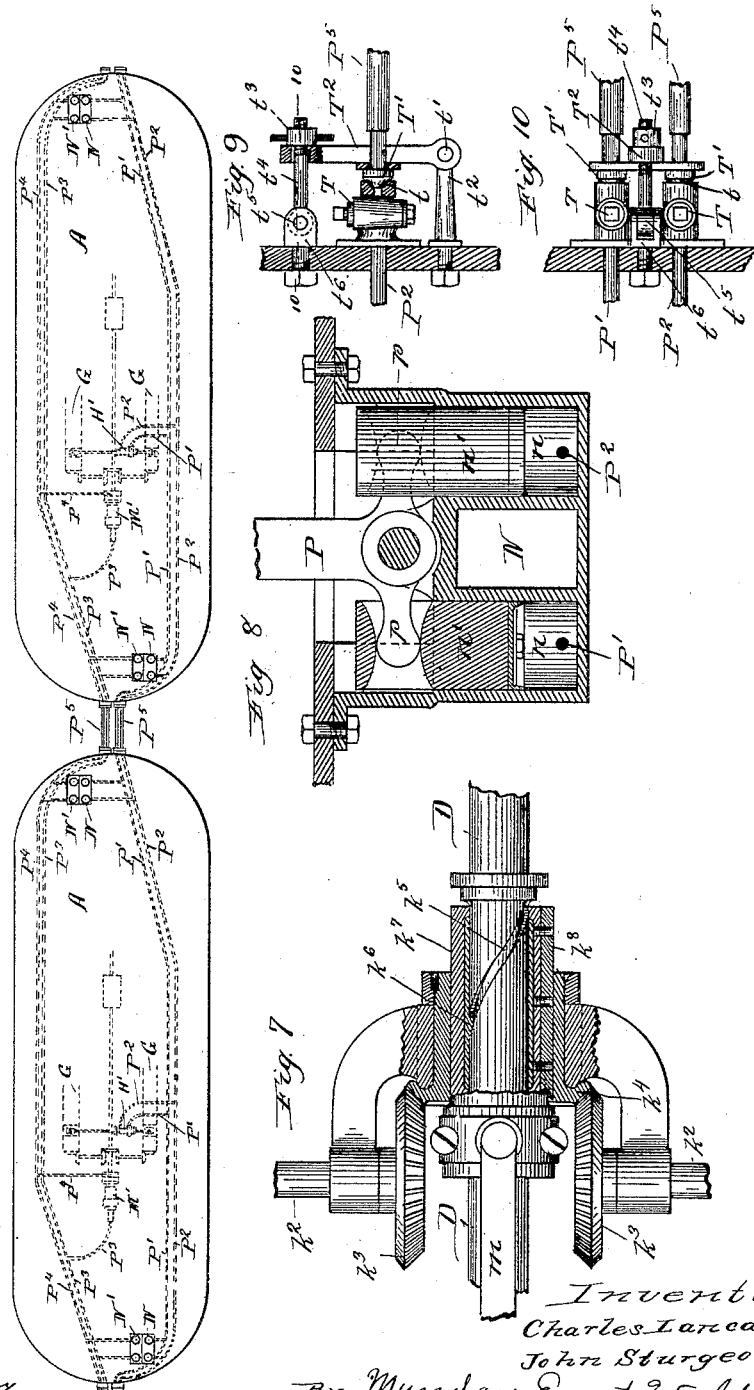

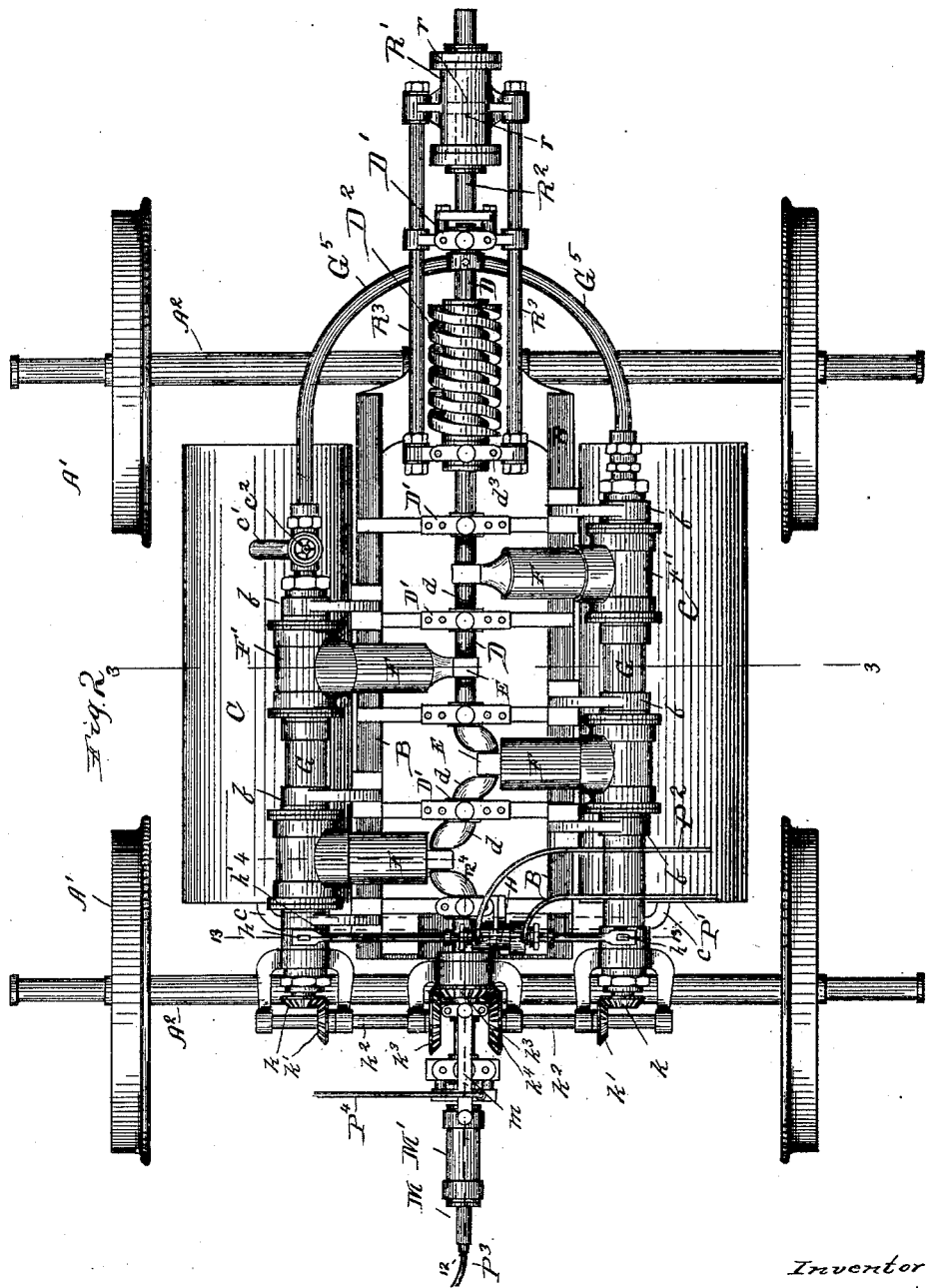

(No Model.) 5 Sheets—Sheet 3.
C. LANCASTER & J. STURGEON.
MOTOR CAR.
No. 467,741. Patented Jan. 26, 1892.
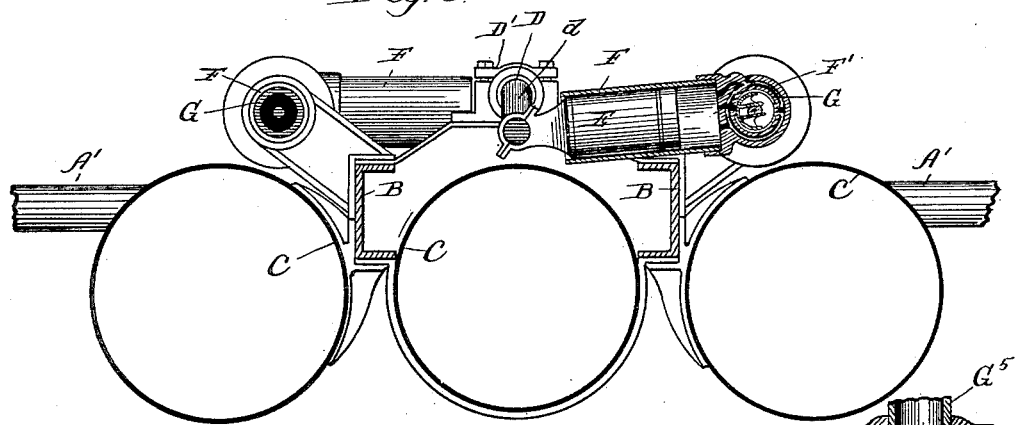
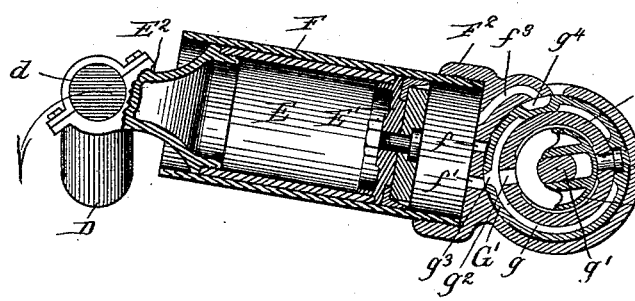
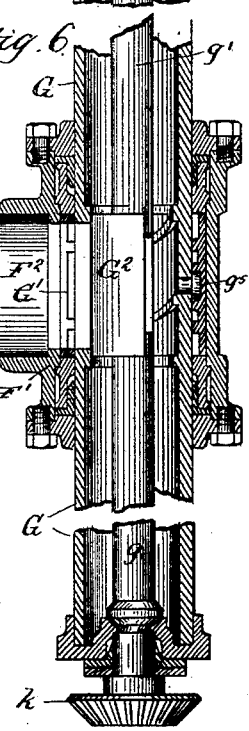
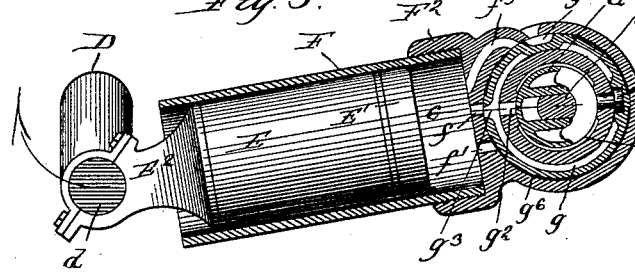
Witnesses:
Geo. C. Curtis
H. W. Munday
Inventors:
Charles Lancaster
John Sturgeon
By Munday, Evarts & Adcock
their Attorneys.
THE NORRIS PETERS CO., PHOTO-LITHO., WASHINGTON, D. C.

(No Model.) 5 Sheets—Sheet 4.
C. LANCASTER & J. STURGEON.
MOTOR CAR.
No. 467,741. Patented Jan. 26, 1892.
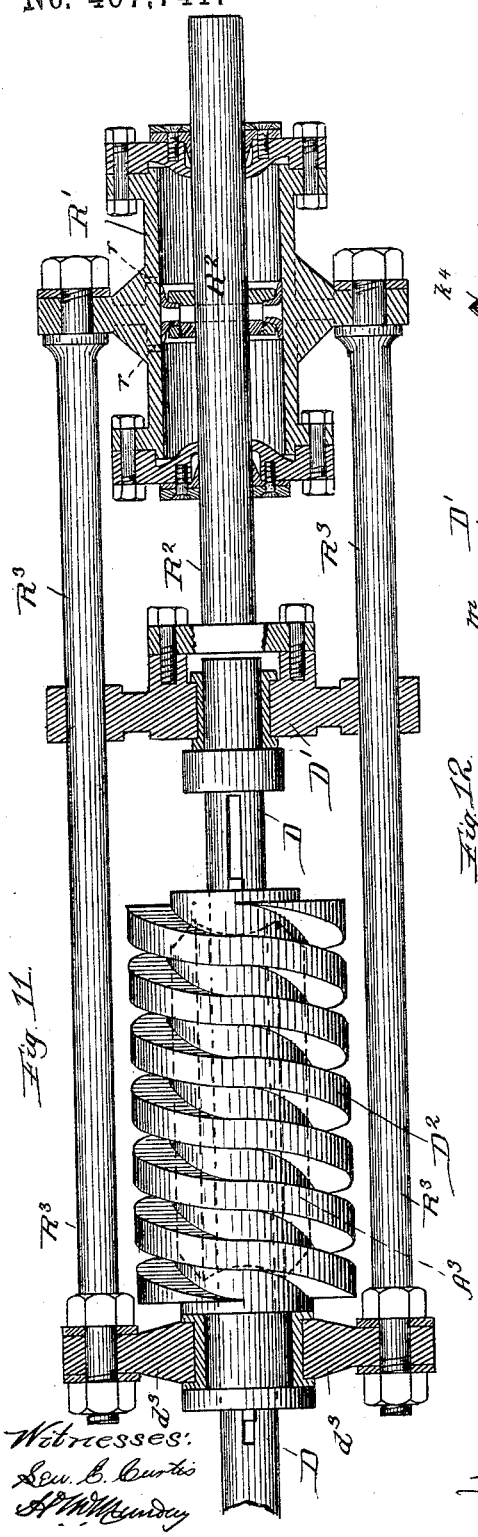
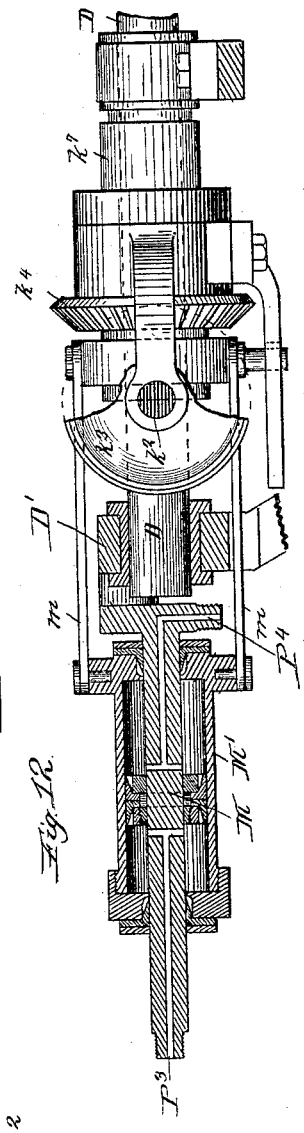
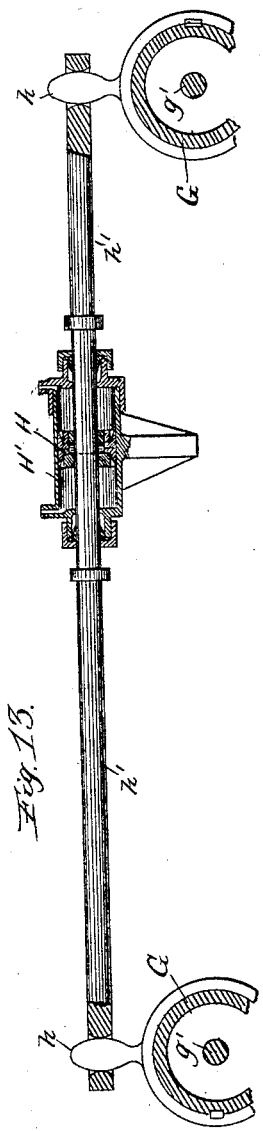
Witnesses:
Inventors:
Charles Lancaster
John Sturgeon
By Munday, Evarts & Adcock
their Attorneys (No Model.) 5 Sheets—Sheet 5.
C. LANCASTER & J. STURGEON.
MOTOR CAR.
No. 467,741. Patented Jan. 26, 1892.
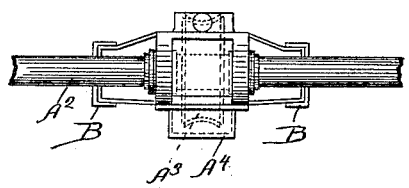
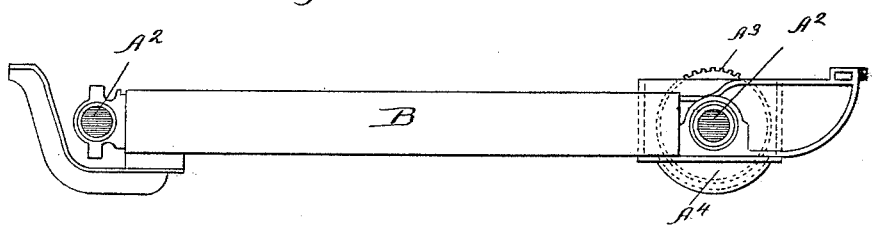
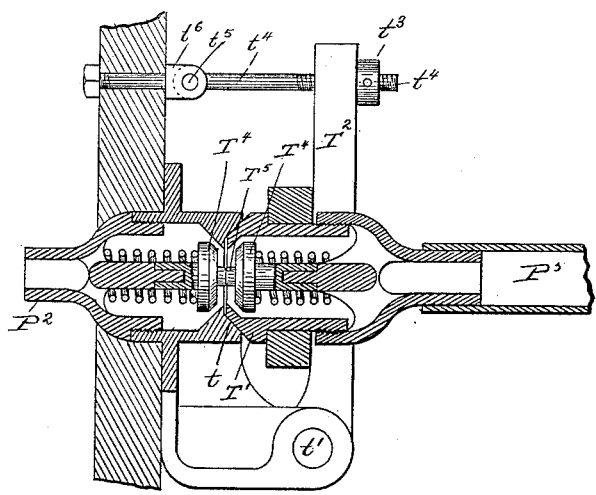

UNITED STATES PATENT OFFICE.

CHARLES LANCASTER AND JOHN STURGEON, OF CHESTER, ENGLAND, ASSIGNORS TO JOHN HUGHES AND CHARLES LANCASTER, OF SAME PLACE.

MOTOR-CAR.

SPECIFICATION forming part of Letters Patent No. 467,741, dated January 26, 1892.

Application filed January 12, 1891. Serial No. 377,415. (No model.)

*To all whom it may concern:*

Be it known that we, CHARLES LANCASTER and JOHN STURGEON, subjects of the Queen of Great Britain, residing in the city of Chester, in the county of Chester, England, have invented a new and useful Improvement in Motor-Cars, of which the following is a specification.

This invention relates to improvements in motor-cars for street or other railways.

It is customary, and indeed frequently necessary, especially in large cities, to connect a number of street-cars together in a train in order to afford the required number of cars to accommodate the people and at the same time prevent obstruction of the street by the too frequent passage of the cars, as would be the case if the same number of cars were run singly; and heretofore where motor-cars have been employed it has been customary to use one motor-car to each train, the other cars or trailers of the train being hauled by the motor-car to which they are connected. The great disadvantage of this system has been the necessity for making the motor-car heavy enough to obtain the necessary adhesion on the track to drag the dead load of the car or cars behind it and the necessity for using heavy and powerful engines to propel the train of several cars. This disadvantage is of course aggravated, and the utility and practicability of such motor-car lines correspondingly diminished in cities where the streets are not level or have any considerable grades.

One object of our invention is to avoid this disadvantage and provide a system of motor-cars which will enable any number of cars to be connected together in a train, each and every car of which has its own motive power within it, all the cars being alike, so that they may be coupled together indifferently or run separately, if desired, and wherein all the motors or engines of all the cars of the train may at all times be under the immediate, direct, and positive control of a single driver located upon the front platform of the front car. The necessity for having all the motors or engines of all the cars in the train under the control of a single driver arises not alone from the diminished number of men thus required to run the train, but chiefly from the fact that if a number of drivers were employed—one for each motor in the train—the precision, certainty, and quickness in the operation of the starting, stopping, and reversing mechanism necessary to the proper controlling of the motion of the cars and to the safety of the public obviously could not be obtained.

As in our system we provide each car with its own motor and utilize the weight of each car to afford the necessary traction or adhesion to propel it, another object of our invention is to make the motor of as light and simple a construction as possible, so that the cars may be cheaply constructed, and so that there may be as little dead weight to be carried as possible.

A further object is to so construct the mechanism for communicating the motion of the motor-driving shaft to the car-axle as to facilitate the starting of the car.

With these objects in view our invention consists, primarily, in a system of two or more cars coupled together in a train, each provided with its own motor furnished with devices for stopping, starting, and reversing the same and means for operating the valves or stopping, starting, and reversing devices for each motor from the platform of one of said cars.

It further consists, in connection with two or more cars, each provided with motors, of the particular means which we have contrived for simultaneously operating the valve-gears of motion-controlling devices of the several motors on the several cars from the platform of the front car, the same being a hydraulic ram or valveless pump and pipe connections. By combining the motors of the several cars together by this means we are enabled to control or operate the stopping, starting, and reversing mechanism of each motor in a certain positive and reliable manner, notwithstanding all the variations in position in respect to each other to which the different cars of the train are constantly being subjected, and thus maintain as complete and perfect control over the train of several motor-cars as though only a single motor were employed.

Our invention further consists in a motor comprising a battery of preferably four or more oscillating single-action trunk cylinders and pistons, half on one side and half on the other side of the main driving-shaft, by which the motion is communicated to the car-axle, the battery of cylinders serving together to impart a practically continuous impulse to the driving-shaft, thus avoiding "dead-centers" and enabling the motor to be started from any position.

It further consists in the particular manner of combining the battery of cylinders, the main driving-shaft, and the car-axle together, and wherein the driving-shaft extends centrally and longitudinally of the car between the two sets of cylinders which are arranged transversely thereto, whereby the motor is made symmetrical and its weight adapted to be equally and centrally distributed over and supported on the car-axles.

It further consists, in connection with the main crank-shaft and the oscillating pistons and cylinders connected thereto, of a hollow trunnion-pipe of special construction, upon which the oscillating cylinders are pivoted, and through or by which the motive power in the form, for example, of compressed air is admitted to the cylinders.

It further consists, in connection with these parts, in utilizing the oscillatory movement of the cylinder or its specially-constructed hollow trunnion-pipe as a means for normally or regularly operating or opening and closing the valves.

It further consists, in connection with the oscillating cylinders and their hollow trunnions, of means for giving a rocking movement to said hollow trunnion to regulate the admission and discharge of compressed air or other actuating-fluid to and from the cylinders for the purpose of reversing the motion of the car.

It further consists in the particular construction and mode of operation of the valves by which the admission and discharge of the compressed air or other actuating-fluid is controlled in order to stop, start, and reverse the motion of the motor.

It further consists in the particular construction of the cylinders and pistons, as will be hereinafter more particularly pointed out. By employing a battery of oscillatory cylinders and pistons and combining the same directly with the crank-shaft or main driving-shaft and by pivoting the cylinders on the hollow trunnions and utilizing the oscillatory movement of the cylinders to normally open and close the inlet and discharge valves in the regular operation of the motor we are enabled to very greatly diminish the number of parts composing the motor and to simplify and cheapen its construction, and also to render its operation more certain and satisfactory. By this means also we are enabled to employ a very simple form of cut off and expansion valve for stopping, starting, and regulating the motion of the motor, the same consisting of a wing or arm on a revolving shaft inside the hollow trunnion.

Our invention further consists in communicating the motion of the main crank or driving shaft of the motor to the car-axle through the intervention of a spring, the spring being preferably a compressed air-spring or a cylinder and piston for compressing the air, so that the motor may start easily and gradually against the resistance of the spring and get well under motion before encountering the full resistance of the load.

It further consists in combining with the motor-driving shaft, car-axle, and its spring a motion-communicating mechanism, comprising a worm and worm-gear, the worm being adapted to slide on the driving-shaft and compress the spring when the car is being started.

Our invention further consists in the novel devices and novel combinations of parts and devices herein shown and described, and more particularly pointed out in the claims.

In the accompanying drawings, which form a part of this specification, and in which similar letters of reference indicate like parts throughout the several figures, Figure 1 is a plan or diagram view representing two cars provided with or embodying our invention, the same particularly showing the means for communicating and operating the valves or motion-controlling devices of the motors on the two cars from the platform of the front car. Fig. 2 is a plan view of one of the motors. Fig. 3 is a transverse section taken on the line 3 3 of Fig. 2. Figs. 4 and 5 are enlarged sections taken on line 4 4 of Fig. 2 to illustrate the construction and operation of the valves, the oscillating cylinder and pistons being shown in different positions in the two figures. Fig. 6 is a longitudinal section of the trunnion pipe and valves, taken on line 6 6 of Fig. 5. Fig. 7 is a horizontal section showing the mechanism for operating the cut-off or expansion valve. Fig. 8 is a central vertical section of the hydraulic ram or valveless pump for communicating motion to the valve-operating mechanism. Fig. 9 is a vertical sectional view showing one device for coupling the connecting-pipes together between the cars. Fig. 10 is a section on the line 10 10 of Fig. 9. Fig. 11 is a horizontal sectional view showing the compressed-air spring. Fig. 12 is a vertical section on line 12 12 of Fig. 2, showing the piston and cylinder for communicating motion to the expansion-valve-operating mechanism. Fig. 13 is a section on line 13 13 of Fig. 2, showing the piston and cylinder for operating the valve-reversing mechanism, and Figs. 14 and 15 are respectively side and end views of the motor-frame. Fig. 16 shows the preferred construction of the coupling device for connecting the pipes together between the cars.

In the drawings we have shown one form of mechanism for reducing our invention to practice, and that which we believe to be the best form for practicing the same. It will be readily understood, however, by those skilled in the art that the particular form and construction of the mechanism may be greatly varied without departing from the essential principle and mode of operation of our invention; also, that some features of our invention may be used independently of the others.

The apparatus which we have shown in the drawings as embodying our invention is one especially designed for using compressed air as the motive power, reservoirs or tanks being provided for carrying a limited supply of compressed air, and while certain features of our invention relate to particularities in the construction of the motor which specially adapt it to compressed air the principal features of our invention are equally adapted to the use of other sources of power than that of compressed air.

In the drawings, A A represent a train, for example, of two motor-cars. Each car is adapted to be coupled in a train of any suitable number of cars or to be run singly.

A' represents the wheels of the car, and A² the car-axles.

B represents the stationary frame-work of the motor, the same being of any suitable form adapted to give support and bearing to the movable parts of the motor.

C represents tanks or reservoirs for containing compressed air in cases where compressed air is used as the motive power.

D is the main driving-shaft of the motor furnished with a number of cranks $d$, one for each piston E of each cylinder F. The driving-shaft D is journaled in suitable bearings D' on the motor-frame. A battery of four cylinders is preferably employed, two arranged on each side of the crank-shaft D. The cylinders F are mounted pivotally upon hollow trunnions or pipes G G, extending parallel to the crank-shaft, one on each side thereof. The trunnions G G are made hollow, so that the compressed air or actuating-fluid may be admitted through them to the cylinders. Surrounding the hollow trunnion G is the main admission-valve G', consisting of a sleeve thereon, there being a chamber or passage $g$ between. Inside the hollow trunnion G is the expansion or cut-off valve $G^2$, the same consisting, preferably, of a segmental ring carried by the shaft $g'$. Surrounding the main admission valve or sleeve G' is the trunnion-box F', which is secured to or forms part of the oscillating cylinder F.

$g^2$ is the port or opening in the trunnion-pipe G through which the compressed air or steam is admitted to the main admission-valve G'.

$g^3$ is the port through the valve-sleeve G' for admitting the compressed air or other actuating-fluid to the cylinder when one of the ports $f f'$ in the trunnion-box F is brought into registry therewith by the oscillation of the cylinder on the main trunnion-pipe.

$g^4$ is the exhaust-port, consisting of a recess in the outer periphery of the valve-sleeve G', the exhaust escaping through this port when the port or passage $f^3$ in the trunnion-box F' is brought into registry therewith by the oscillation of the cylinder on the main trunnion-pipe. Two ports $f f'$ are employed in the oscillating trunnion-box F', so that the motion of the motor may be reversed by simply rocking or turning the trunnion-pipe G and valve G' slightly on its axis, so that one or the other of the ports $f f'$ will be brought into registry with the admission-port $g^3$, as is clearly illustrated in Figs. 4 and 5.

Fig. 4 shows the trunnion-pipe G and valve G' in one position—for example, the one to cause the motor to propel the car forward—and Fig. 5 shows the trunnion-pipe G and valve G' in the other position—the one that causes the motor to propel the car backward. The trunnion-pipe G and valve G' are retained in their proper position by a pin $g^5$. The trunnion-pipe and main valve being normally fixed in one position, the oscillation of the cylinder brings one of the admission-ports $f$ or $f'$ and the exhaust-port $f^3$ alternately opposite or in registry with the admission and exhaust ports $g^3$ or $g^4$ in the main valve G' when the engine is running in one direction, the other admission-port $f$ or $f'$ being closed. To reverse the engine, the trunnion-pipe is turned partly around, bringing the other port $f'$, for example, into action instead of the first one $f$, and also reversing the action of the exhaust-port.

The expansion or cut-off valve $G^2$ is a semi-cylindric valve of the Corliss shape, which is caused to revolve the inside trunnion-pipe G at the same speed as the crank-shaft D. The steam or compressed-air port $g^2$ in the trunnion-pipe G will thus be closed by this expansion-valve during half a revolution (or a little more than half) and open during the remaining portion of the revolution. Hence by changing the position of this expansion-valve $G^2$ relatively to that of the crank-shaft D it may be made to revolve so as to keep its port closed during the whole time the main admission-port is open or to keep open during the whole of that period. It is therefore obvious that by varying its position between these two extremes any desired point of cut-off and grade of expansion may be obtained from zero to full stroke. It will also be seen from the form of these valves that the tendency is for the air or other actuating-fluid pressure to keep them constantly pressed up against their faces—that is, to keep constantly following up the wear—and thus prevent all leakage through the valves, while at the same time undue friction is avoided by the admission of counteracting pressure over a portion of their opposite surfaces by means of the chambering $g^6$, as shown in the drawings. In the case of the revolving expansion-valve this chambering has been made of spiral form to insure equality of wear over the surface of the valve.

As before stated, one feature of the improvement consists in the particular construction of the cylinders E F. We make these cylinders and also the pistons of drawn or brazed tubing, one fitting into the other. These have only to be cut off to the proper lengths, and the cylinder-tube F is then simply threaded at one end and screwed into the threaded socket $F^2$ of the trunnion-box F'. The similar, but slightly smaller, tube forming the ram or piston E has one end closed into a cap-ring E' and its other end is secured to the connection-piece $E^2$, which connects the piston with the crank-shaft. By this means the cylinders and pistons or rams are obtained of the lightest possible construction with surfaces true and sound without waste of material in turning and boring and without labor or tool-work upon them, except the cutting to proper lengths and screwing the ends. We thus avoid all risk of waste and labor expended thereon. The pistons E being thus made of tubing and hollow, we fill or prefer to fill them with oil, so that it may lubricate both the crank and the sliding surfaces between the piston and cylinder.

The required movements may be imparted to the movable parts of the valve mechanism by any suitable devices known to those skilled in the art. The means which we prefer to employ and that which we have devised for the purpose is shown in the drawings. The oscillation of the trunnion-pipe G to reverse the engine is effected by levers or arms $h\ h$, secured to the trunnion-pipes G, and connected together by a rod $h'$, which is actuated by a hydraulic piston and cylinder H H', one part being secured to the rod $h'$ and the other to the frame of the machine. The shaft $g'$ of the revolving expansion-valve $G^2$ is geared to the main driving-shaft D by any suitable gearing—as, for example, the bevel-gears $k$ $k'$, shaft $k^2$, and bevel-gears $k^3\ k^4$. The alteration of the angle or setting of the expansion-valve $G^2$ in respect of the main driving-shaft D is effected by means of a spiral groove and key $k^5\ k^6$, fitted in a sliding boss $k^7$ on the main driving-shaft D and to which the principal driving bevel-gear $k$ is attached by means of a sliding key $k^8$. By sliding this boss $k^7$ in or out the main driving bevel-wheel $k$ is partly rotated, turning the whole train of wheels, and thereby adjusting the position of the expansion-valve $G^2$—that is, by altering the position of the sliding boss or bush $k^7$ the same effect is produced as though the wheel $k$ were keyed on the main shaft D in a different position, thereby imparting different positions to the expansion-valve. By this arrangement the pressure may be entirely shut off from the engine, which would thus be stopped, the valve thus operating as a main stop-valve.

As all the four cylinders, pistons, and their valves or motion-controlling devices are of precisely the same construction, the description of one suffices for all.

The sliding bush or boss $k^7$ may be moved in or out to adjust the position of the expansion-valve $G^2$ by any suitable means. That which we have specially devised and prefer to employ for this purpose consists in a piston and cylinder M M', the stationary part connected to the frame, and the movable part connected by straps $m$ to the sliding bush or boss $k^7$. The construction of this piston and cylinder and connecting mechanism is clearly shown in Fig. 12.

Motion is communicated to the movable piston H of the hydraulic cylinder H' to operate the motion-reversing mechanism of the motor by means of a hydraulic ram or pump N on the platform of the front car, the cylinders of which are connected in a closed circuit with the cylinder H' by the pipes P' $P^2$. The hydraulic ram or pump N is preferably provided with two cylinders or chambers $n\ n$ and two pistons or plungers $n'\ n'$, the same being actuated by a hand-lever P, provided with two arms $p$, one for each piston $n'$. The particular construction of the ram or pump N is clearly shown in Fig. 8 and the pipe connections are shown in Fig. 1. The cylinders H' and $n\ n$ and the pipe connections P' $P^2$ are preferably filled with some non-freezing and incompressible liquid. A similar hydraulic ram or pump N', connected by pipes $P^3$ $P^4$ with the cylinder M', is employed to impart motion to the sliding boss or bush $k^7$, by which the position of the cut-off or expansion valve $G^2$ is adjusted or regulated. As the construction and operation of this second ram N' is the same as that of ram N, already described, its description need not be repeated.

In order that each car may be adapted to act as the front car of the train, we provide all the cars with the rams N N', though of course only one pair of rams is used at a time, and in order to adapt each car to run with either end in front, so that the cars may be coupled together indiscriminately and without trouble or inconvenience, we provide a pair of these operating-rams N N' on each platform of each car, as is clearly indicated in Fig. 1 of the drawings. When the actuating-lever P of the ram N or N' is pushed to one side by the operator or driver on the front platform of the front car, one of the pistons $n'\ n'$ is depressed and the other raised, so that the liquid which fills the ram, the valve-actuating cylinder, and the connecting-pipes is by this movement of the ram drawn away from one end of the actuating-cylinder H' or M' and forced in at the other end, thus actuating the valve through its appropriate connecting mechanism, and as the pipes P' $P^2$ or $P^3$ $P^4$ of all the cars of the train are connected together the valve-actuating hydraulic cylinders and pistons H H' and M M' of all the cars will be similarly and simultaneously operated. When two or more cars are connected together in a train, the respective connecting-pipes leading to the operating-ram from the reversing or expansion valve actuating cylinders are joined up by short flexible coupling-pipes P⁵. These coupling-pipes may be of any suitable construction known to those skilled in the art. The construction of coupling devices which we prefer to employ is clearly indicated in Figs. 9, 10, and 16. The coupling shown in Figs. 9 and 10 consists of a pair of cocks or valves T, having each a conical socket $t$ to receive the conical plugs T' on the ends of the flexible coupling-pipes P⁵. The hollow conical plugs T' are firmly held in place in their socket $t$ by a lever or link T², pivoted at $t'$ to a bracket $t^2$ and held in place by a hand-nut $t^3$ on the threaded pin $t^4$, which is pivoted at $t^5$ to the lug $t^6$. The conical plugs $t^5$ are fitted loosely in the carrier that holds them together, so as to enable them to find their true bearings in the socket $t$ when screwed up. In the coupling shown in Fig. 16, which is the preferred construction, automatic spring-actuated valves T⁴ are substituted for the hand-operated cocks T'. The valves T⁴ are furnished with projecting buttons T⁵, which serve to automatically open the valves when the socket-pieces are forced together. This latter construction prevents the formation of an air-cushion in the space between the cocks T and a socket $t$, as shown in Figs. 9 and 10. By this means the connecting-pipes leading to the valve actuating or controlling devices can be very quickly and effectually coupled together. The hollow trunnions or pipes G are supported or journaled upon suitable brackets $b$, projecting from frame B of the motor. The two trunnion-pipes G—one on each side—are connected together by a pipe G⁵, a stuffing-box joint or connection G⁶ being provided to permit the trunnion-pipe to oscillate or turn in respect to the curved connecting-pipe G⁵. The compressed-air reservoir C may preferably consist of two or more separate tanks connected together by a pipe $c$. The compressed air is admitted into pipe G⁵ from one of the tanks C through a connecting-pipe $c'$, a cock or valve $c^2$ being provided to shut off the communication when desired. The engine-frame B is bolted to the oil bath or box A⁴ of the worm-wheel A³ and thus supported on the driving-axle, and it is or should be connected to the other axle by means of a universal joint A⁷, which allows of a limited amount of movement in any direction.

Motion is communicated from the main driving-shaft D to the car-axle A². This is preferably done by means of a worm-gear on the axle A², which meshes with a worm D' on the driving-shaft D. The worm-wheel A³, which is keyed onto one of the axles, is inclosed in a box A⁴, in which a supply of oil is maintained, so that the wheel may run in a bath of oil. The frame-work B, carrying the engine and main shaft, is attached to the axles A² A², so as to go with them and maintain the worm-wheel always in gear. We prefer to make the angle of the teeth such that the weight of the car could not drive the teeth backward against the teeth of the worm, which, on the contrary, forms a deadlock to the axle, and thus avoids the necessity of having any brake-gear fixed to the car, and thus, in fact, operating as an automatic brake. Instead of having the worm D' rigidly fixed to the driving-shaft D, it is arranged to slide thereon, the shaft being splined or squared for this purpose. The worm is retained in its position centrally over the axle by means of springs which act against the worm D'. Any suitable form of spring or springs may of course be used, but that which we prefer to employ is a compressed-air spring, the same comprising a cylinder R' and piston R². The piston R² is preferably stationary, the cylinder R' being movable and connected by rods R³ with the worm D'.

On starting the car the first two or three turns of the worm are applied to the compressing of the spring on either one side or the other, according to the direction, the worm simply threading its way through the teeth of the worm-wheel like a screw in a nut until the resistance of the spring becomes equal to that of the car, after which the worm-wheel begins to run, carrying around the axle. This arrangement enables the engine or motor to be started easily and got into motion, as it has not to start at once against the full load, including the inertia of the car, but is started easily and gradually against the least resistance and is got well under way before the full resistance is met. After the car is started and got fairly under motion the worm will settle back into a position corresponding to the work of traction at the time being. The worm D' is of course made of sufficient length to compress or wind up the spring without running itself out of gear with the worm-wheel. The air is admitted to the cylinder R' through an opening $r$ in the middle, which is closed the moment the piston passes it and compressed by its continued movement. The working length of the cylinder may be adjusted by pouring in a sufficient quantity of oil to fill the ends to the required extent. The cylinder is made double-acting and is connected by the rods R³ and a loose collar $d^3$ with the boss of the worm, this being done to save room, the car being too short to conveniently allow of a separate spring at each end of the worm.

It is not necessary that the compressed-air tanks of the several cars should be connected together, as one car may be propelled for a time by another in case its supply of compressed air should become exhausted.

We claim—

1. The combination, with a train of two or more cars, of a motor on each car provided with valves or devices for controlling its motion, a hydraulic ram or pump on one of said cars, and pipes connecting said hydraulic ram with the valves or motion-controlling mechanism of each motor, whereby all the motors may be simultaneously operated, substantially as specified.

2. The combination, with a train of two or more cars, of a motor on each car furnished with motion-controlling devices and a hydraulic cylinder and piston on each car for actuating the motion-controlling devices of the motors, a hydraulic ram or pump on one of the cars, and pipes connecting said ram with said actuating-cylinders on said cars, whereby all the motors may be simultaneously operated from one car, substantially as specified.

3. The combination, with two or more cars coupled together in a train, having a motor on each car furnished with a reversing-valve and an expansion or cut-off valve for stopping, starting, and regulating the motion of the motor, of a hydraulic cylinder and piston on each car for actuating the reversing-valve mechanism, and a second hydraulic cylinder and piston for actuating the cut-off or expansion valve of each motor, and a pair of hydraulic rams on one of said cars and connecting-pipes leading to said hydraulic cylinders of each of said motors, whereby all the motors may be simultaneously operated from one car, substantially as specified.

4. A train of two or more motor-cars coupled together, the motor of each car having valves and a valve-actuating hydraulic cylinder and piston, and each car being further provided with a hydraulic ram or pump and connecting-pipes leading to said hydraulic cylinder to adapt the motor to be operated from either end of either car, substantially as specified.

5. The combination, in a motor-car, of a motor with a hydraulic cylinder for actuating the valve-controlling device of said motor and a hydraulic ram or pump, and connecting-pipes leading to said cylinder for operating the same, substantially as specified.

6. The combination, in a motor-car, of a motor furnished with two valves, two hydraulic cylinders and pistons for actuating said valve independently of each other, and two hydraulic rams or pumps and connecting-pipes leading to said cylinders for operating the same, substantially as specified.

7. The combination, in a motor-car, of a motor furnished with two valves, two hydraulic cylinders and pistons for actuating said valves independently of each other, and two hydraulic rams or pumps, and connecting-pipes leading to said cylinders for operating the same, there being one pair of said hydraulic rams or cylinders at each end of the car to adapt the car to be operated from either end, substantially as specified.

8. The combination of the car and its axle having a central driving-shaft extending longitudinally of the car under the car-platform, and a battery of oscillating cylinders and pistons arranged beneath the car-platform, half on each side of said driving-shaft, said cylinders oscillating on hollow trunnions, through which the motive fluid is admitted to said cylinders, substantially as specified.

9. In a motor-car, the combination, with the car and its axle, of a motor comprising a battery of four or more oscillating cylinders, and pistons arranged beneath the car-body, half on each side of the common driving-shaft, said driving-shaft extending longitudinally of the car and said cylinders oscillating on hollow trunnions, one on each side of said driving-shaft and through which the motive fluid is admitted to said cylinders, said hollow trunnions having an independent rocking movement upon their own axes, substantially as specified.

10. In a motor-car, the combination, with a car-axle, of a battery of four or more oscillating trunk-cylinders and pistons arranged beneath the car-platform, half on each side of the main crank-shaft, said cylinders oscillating on hollow trunnions, one on each side of said crank-shaft, and mechanism for communicating motion from said crank-shaft to said car-axle, said crank-shaft extending longitudinally of the car under the car-platform, substantially as specified.

11. The combination, with a car-axle, of a main crank-shaft connected therewith and a battery of four or more oscillating trunk-cylinders, and pistons arranged half on each side of said crank-shaft and beneath the car-platform, the pistons of said cylinders being jointed to said crank-shaft, and said cylinders oscillating on hollow trunnions, one on each side of said crank-shaft, through which the motive fluid is admitted to said cylinders, said trunnions having an independent rocking movement on their own axes, substantially as specified.

12. The motor comprising a main crank-shaft and a battery of oscillating trunk-cylinders and pistons arranged half on each side of said crank-shaft, and hollow trunnions or pipes, one upon each side of said crank-shaft, upon which the oscillating cylinders are pivoted and through which the motive fluid is admitted to said cylinders, said pistons being connected to the crank-shaft, substantially as specified.

13. The motor comprising a main crank-shaft and a battery of oscillating trunk-cylinders and pistons arranged half on each side of said crank-shaft, and hollow trunnions or pipes, one upon each side of said crank-shaft, upon which the oscillating cylinders are pivoted and through which the motive fluid is admitted to said cylinders, said pistons being connected to the crank-shaft, said hollow trunnions having an independent rocking movement on their own axes and being provided with revolving cut-off or expansion valves inside the same, and trunnion-boxes surrounding the same, provided with admission and exhaust ports, said cylinders being secured to said trunnion-boxes, substantially as specified.

14. The combination of an oscillating piston and cylinder with a rocking hollow trunnion or pipe, upon which said cylinder is pivoted and through which the motive fluid is admitted to the cylinder, a revolving cut-off or expansion valve inside said hollow trunnion, and a trunnion-box surrounding said hollow trunnion, provided with admission and exhaust ports through the same, said cylinder being secured to said trunnion-box, substantially as specified.

15. The combination of an oscillating piston and cylinder with a rocking hollow trunnion or pipe, upon which said cylinder is pivoted and through which the motive fluid is admitted to the cylinder, a revolving cut-off or expansion valve inside said hollow trunnion, and a trunnion-box surrounding said hollow trunnion, provided with admission and exhaust ports through the same, said cylinder being secured to said trunnion-box, and a crank-shaft operated by said piston, the position of said cut-off or expansion valve being adjustable in respect to said crank-shaft to control the cutting-off point, substantially as specified.

16. The combination of crank-shaft D with piston E connected thereto, oscillating cylinder F, hollow trunnion G, trunnion-box F', furnished with admission and exhaust ports, valve-sleeve G', and cut-off or expansion valve $G^2$ inside said trunnion-pipe, substantially as specified.

17. The combination of crank-shaft D with piston E connected thereto, oscillating cylinder F, hollow trunnion G, trunnion-box F', furnished with admission and exhaust ports, valve-sleeve G', and cut-off or expansion valve $G^2$ inside said trunnion-pipe, said hollow trunnion G and valve-sleeve G' having a rocking movement on their axis to reverse the engine, substantially as specified.

18. The combination of crank-shaft D with piston E connected thereto, oscillating cylinder F, hollow trunnion G, trunnion-box F', furnished with admission and exhaust ports, valve-sleeve G', and cut-off or expansion valve $G^2$ inside said trunnion-pipe, said expansion or cut-off valve $G^2$ being movable in respect to its relation to said crank-shaft to control or regulate the cut-off, substantially as specified.

19. The combination of crank-shaft D with piston E connected thereto, oscillating cylinder F, hollow trunnion G, trunnion-box F', furnished with admission and exhaust ports, valve-sleeve G', and cut-off or expansion valve $G^2$ inside said trunnion-pipe, said hollow trunnion G and valve-sleeve G' having a rocking movement on their axis to reverse the engine, said expansion or cut-off valve $G^2$ being movable in respect to its relation to said crank-shaft to control or regulate the cut-off, substantially as specified.

20. The motor provided with piston E and cylinder F, each formed of drawn or brazed tubing cut the proper lengths and having suitable end pieces attached, substantially as specified.

21. The motor provided with piston E and cylinder F, each formed of drawn or brazed tubing cut to proper lengths, said piston having a cap-ring E' and joint-piece $E^2$ attached and said cylinder being screw-threaded to a trunnion-box F', substantially as specified.

22. The combination, with crank-shaft D, of hollow trunnion-pipes G G, one on each side of said crank-shaft, oscillating trunk-cylinders F and pistons E, trunnion-box F', having ports $f$ $f'$ $f^2$ through the same, valve-sleeves G', and revolving cut-off or expansion valves $G^2$ inside said trunnions, said trunnion-pipes G having arms $h$ $h$, connecting-rod $h'$, and hydraulic cylinder and piston H H' for oscillating said trunnion-pipes to reverse the engine, substantially as specified.

23. The combination, with crank-shaft D, of hollow trunnion-pipes G G, one on each side of said crank-shaft, oscillating trunk-cylinders F and pistons E, trunnion-box F', having ports $f$ $f'$ $f^2$ through the same, valve-sleeves G', revolving cut-off or expansion valves $G^2$ inside said trunnions, said trunnion-pipes G having arms $h$ $h$, connecting-rod $h'$, and hydraulic cylinder and piston H and H' for oscillating said trunnion-pipes to reverse the engine, and gearing connecting said revolving cut-off or expansion valves with said crank-shaft D, substantially as specified.

24. The combination, with crank-shaft D, of hollow trunnion-pipes G G, one on each side of said crank-shaft, oscillating trunk-cylinders F and pistons E, trunnion-box F', having ports $f$ $f'$ $f^2$ through the same, valve-sleeves G' revolving cut-off or expansion valves $G^2$ inside said trunnions, said trunnion-pipes G having arms $h$ $h$, connecting-rod $h'$, and hydraulic cylinder and piston H and H' for oscillating said trunnion-pipes to reverse the engine, and gearing connecting said revolving cut-off or expansion valves with said crank-shaft D, the driving-gear on said crank-shaft being movable or adjustable for regulating the position of said cut-off valves, substantially as specified.

25. The combination, with crank-shaft D, of hollow trunnion-pipes G G, one on each side of said crank-shaft, oscillating trunk-cylinders F and pistons E, trunnion-box F', having ports $f$ $f'$ $f^2$ through the same, valve-sleeves G', revolving cut-off or expansion valves $G^2$ inside said trunnions, said trunnion-pipes G having arms $h$ $h$, connecting-rod $h'$, and hydraulic cylinder and piston H and H' for oscillating said trunnion-pipes to reverse the engine, and gearing connecting said revolving cut-off or expansion valves with said crank-shaft D, the driving-gear on said crank-shaft being movable or adjustable for regulating the position of said cut-off valves, said adjusting mechanism consisting of a sliding sleeve having a spiral connection with said driving-shaft, substantially as specified.

26. The combination, with crank-shaft D, of hollow trunnion-pipes G G, one on each side of said crank-shaft, oscillating trunk-cylinders F and pistons E, trunnion-box F', having ports $f\, f'\, f^2$ through the same, valve-sleeves G', revolving cut-off or expansion valves $G^2$ inside said trunnions, said trunnion-pipes G having arms $h\, h$, connecting-rod $h'$, and hydraulic cylinder and piston H and H', for oscillating said trunnion-pipes to reverse the engine, gearing connecting said revolving cut-off or expansion valves with said crank-shaft D, the driving-gear on said crank-shaft being movable or adjustable for regulating the position of said cut-off valves, said adjusting mechanism consisting of a sliding sleeve having a spiral connection with said driving-shaft, and a hydraulic cylinder and piston for sliding said sleeve, substantially as specified.

27. The combination of the crank-shaft D with a revolving and adjustable cut-off or expansion valve $G^2$, a sliding spiral sleeve $k^7$, keyed to the main driving-gear $k^4$, and a hydraulic cylinder and piston for actuating said sleeve, substantially as specified.

28. The means for regulating the operative length of the air-containing cylinder, consisting in the admission or discharge of oil or other non-compressible liquid, so as to practically shorten or lengthen said cylinder, with the result of producing greater or less compression of the air therein, thereby producing an effect equivalent to the tightening or slackening of a metallic spring, substantially as specified.

29. A train of two or more motor-cars coupled together, the motor of each car having valves and a valve-actuating hydraulic cylinder and piston, and each car being further provided with a hydraulic ram or pump and connecting-pipes leading from one car to the other and communicating with said hydraulic cylinder to adapt the motors to be operated from either end of the car, an automatic coupling device for said connecting-pipes, consisting in hollow socket-pieces furnished with spring-actuated valves provided with projecting buttons adapted to engage each other and open said valves when said socket-pieces are forced together, substantially as specified.

CHAS. LANCASTER.
JOHN STURGEON.

Witnesses:
WM. H. CUNLIFFE,
 Queen's Park, Chester.
I. I. MOORE,
 23 Egerton St., Chester.